United States Patent Office 3,138,528
Patented June 23, 1964

---

3,138,528
STABLE, AQUEOUS SOLUTIONS OF 21-PHOSPHATE ESTERS OF 21-HYDROXY STEROIDS
David Marcus, East Brunswick, and Charles Riffkin, Highland Park, N.J., assignors to Olin Mathieson Chemical Corporation, New York, N.Y., a corporation of Virginia
No Drawing. Filed May 1, 1962, Ser. No. 191,424
5 Claims. (Cl. 167—58)

This invention relates to pharmaceutical solutions suitable for parenteral and ophthalmic administration.

Prior to this invention it was known that 21-phosphate esters of 21-hydroxy steroids were advantageous in the preparation of aqueous steroid solutions, since these esters, unlike the simple esters, such as the 21-acetates, are water-soluble. The 21-phosphate esters, however, undergo hydrolysis rather readily and, therefore, to assure adequate therapeutic dosages the esters either had to be reconstituted immediately prior to use or had to be stabilized in solution (see U.S. Patent No. 2,970,944).

It has now been found that a stable aqueous solution of a 21-phosphate ester of a 21-hydroxy steroid, suitable for use as a parenteral or ophthalmic preparation, can be prepared if a water-soluble saccharin is incorporated in the solution. By a water-soluble saccharin is meant a saccharin salt more water-soluble than is saccharin itself. Such water-soluble saccharins include the alkali metal salts, such as sodium and potassium saccharin, ammonium saccharin, and water-soluble amine salts of saccharin.

Among the suitable steroids utilizable as medicaments in the compositions of this invention can be mentioned the 21-phosphate esters of all physiologically active 21-hydroxy steroids, such as hydrocortisone, cortisone, prednisolone, prednisone, $9\alpha$-fluorohydrocortisone, $9\alpha$-fluoroprednisolone, $6\alpha,9\alpha$-difluorohydrocortisone, $6\alpha,9\alpha$-difluoroprednisolone, triamcinolone, triamcinolone acetonide, $6\alpha$-methylprednisolone, dexamethasone, etc. The phosphate ester is present in the form of a water-soluble salt, such as an alkali metal salt (e.g., a sodium or potassium salt), an ammonium salt, or a water-soluble amine salt. The phosphate ester can be added to the formulation in the form of the salt, or the salt may be formed in situ as more fully described hereinafter.

To prepare the compositions of this invention, the steroid, the water soluble saccharin and preferably an antioxidant are mixed in an aqueous medium and the resulting solution is adjusted to a pH of about 6 to about 8 (preferably about 6.5 to about 7.5), by the addition of a base, such as an alkali metal hydroxide (e.g., sodium hydroxide). As antioxidants, inorganic compounds such as alkali metal sulfites, alkali metal bisulfites and alkali metal hypophosphites, and organic compounds such as alkali metal citrates, thioglycol, pyridine sulfinic acid, thiourea and sodium formaldehyde sulfoxylate, may be used.

In addition to the stabilizer and the antioxidant, other substances such as preservatives may be used. Such preservatives include methyl and propyl paraben, phenol, benzyl alcohol and phenethyl alcohol. To assure that the composition remains in the desired pH range, a buffering agent such as sodium citrate, disodium and monosodium phosphate, and sodium acetate may also be incorporated in the medium.

The compositions can also contain other therapeutically active ingredients, such as antibiotics (e.g., neomycin).

In the preferred compositions of this invention, the steroid is present in a concentration of about 0.025 mg. to about 100 mg. per ml. of solution (optimally about 0.1 mg. to about 50 mg.), the higher concentrations being used for parenteral formulations; the water soluble saccharin is present in a concentration of about 1 mg. to about 20 mg. per ml. of solution; and the antioxidant is present in a concentration of about 0.5 mg. to about 10 mg. per ml. of solution (optimally about 1 mg. to about 5 mg.). When the compositions of this invention are to be used parenterally (e.g., intravenously or intramuscularly) the pH is preferably about 7.0 to about 7.8, and optimally about 7.4. When the compositions of this invention are to be used ophthalmicly the pH is preferably about 6.5 to about 7.2.

The following examples illustrate the invention:

Example 1

To prepare a liter of solution, the following ingredients are used:

| | G. |
|---|---|
| Triamcinolone 16,17-acetonide 21-phosphate (dipotassium salt) | 1.39 |
| Sodium citrate (anhydrous) | 10.0 |
| Sodium saccharin | 5.0 |
| Sodium bisulfite | 2.2 |
| Phenethyl alcohol | 2.2 |
| 1 N sodium hydroxide, q.s., pH 7.1–7.2. | |
| Distilled water, q.s. 1.0 liter. | |

1.2 liters of water is boiled and nitrogen sparged and then cooled to room temperature. To 0.9 liter of the water is added the sodium bisulfite, the sodium citrate, the sodium saccharin, the phenethyl alcohol and the triamcinolone 16,17-acetonide 21-phosphate. The pH of the resulting mixture is adjusted with 1 N sodium hydroxide to a pH of 7.1 to 7.2 and sufficient water is added to give a final volume of 1.0 liter. The solution is then aseptically filtered through a Selas No. 02 stone and filled into 5 cc. amber sterile bottles.

Example 2

To prepare a liter of solution for ophthalmic formulation, the following ingredients are used:

| | G. |
|---|---|
| Triamcinolone 16,17-acetonide 21-phosphate (dipotassium salt) | 1.0 |
| Sodium citrate | 10.0 |
| Sodium bisulfite | 2.0 |
| Neomycin base | 2.5 |
| Sodium saccharin | 10.0 |
| Phenethyl alcohol | 2.0 |
| 1 N sodium hydroxide, q.s., pH 7.2. | |
| Distilled water, q.s. 1.0 liter. | |

The sodium bisulfite, sodium citrate, sodium saccharin, phenethyl alcohol and steroid are dissolved in 850 ml. of distilled water, previously boiled and nitrogen sparged. The neomycin is dissolved separately in 100 ml. of distilled water and slowly added to the steroid solution. The pH is adjusted with the 1 N sodium hydroxide to 7.2 and sufficient water is added to give a final volume of 1.0 liter.

Example 3

To prepare a liter of solution for parenteral formulation, the following ingredients are used:

| | G. |
|---|---|
| Triamcinolone 16,17-acetonide 21-phosphate (dipotassium salt) | 40.0 |
| Sodium citrate | 10.0 |
| Sodium saccharin | 20.0 |
| Sodium bisulfite | 2.0 |
| Methyl paraben | 1.3 |
| Propyl paraben | 0.15 |
| Water for injection, q.s. 1.0 liter. | |

The solution is prepared by the processes described in the preceding examples.

To show the effect of the sodium saccharin in stabilizing aqueous solutions of 21-phosphate esters of steroids, the following two compositions were assayed.

Composition A:                                                Mg.
  Triamcinolone 16,17-acetonide 21-phosphate (dipotassium salt) _____ 1.0
  $NaH_2PO_4$ _____ 1.4
  $Na_2HPO_4$ _____ 2.3
  Sodium bisulfite _____ 2.0
  Sodium chloride _____ 5.0
  Phenethyl alcohol _____ 5.0
  1 N Sodium hydroxide, q.s., pH 7.0.
  Distilled water, q.s. 1.0 ml.

Composition B:
  Triamcinolone 16,17-acetonide 21-phosphate (dipotassium salt) _____ 1.0
  Sodium citrate _____ 10.0
  Sodium saccharin _____ 5.0
  Sodium bisulfite _____ 2.0
  Phenethyl alcohol _____ 5.0
  1 N Sodium hydroxide, q.s., pH 7.0.
  Distilled water, q.s. 1.0 ml.

These compositions were stored at 5° C., room temperature 37° C. and 50° C. for the indicated time and assayed monthly for residual triamcinolone 16,17-acetonide 21-phosphate (mg./ml.) with the results given in the following table.

| Temperature | Assay after— | | | | | |
|---|---|---|---|---|---|---|
| | 1 month Composition | | 2 months | | 3 months | 6 months |
| | A | B | A | B | B | B |
| 5° C. | 1.09 | 1.21 | 1.12 | 1.23 | 1.27 | 1.16 |
| Room temperature | 0.97 | 1.21 | 0.90 | 1.15 | 1.33 | 1.17 |
| 37° C. | 0.61 | 1.19 | -------- | 1.15 | 1.24 | 1.15 |
| 50° C. | 0.06 | 1.09 | -------- | 1.02 | 0.98 | -------- |

This table shows that without the sodium saccharin the composition shows a definite loss of steroid activity when stored at room temperature after two months; almost 50% loss of activity when stored at 37° C. after only one month; and an almost total loss of activity when stored at 50° C. after only one month; whereas with sodium saccharin the composition is stable when stored at any of these temperatures after three months and is stable when stored at any temperature except 50° C. after six months.

The invention may be variously otherwise embodied within the scope of the appended claims.

What is claimed is:

1. A pharmaceutical formulation suitable for parenteral and ophthalmic administration which comprises in an aqueous solution having a pH of about 6 to about 8, a 21-phosphate ester of a physiologically active 21-hydroxy steroid and a salt of saccharin more water soluble than saccharin itself.

2. A pharmaceutical formulation suitable for parenteral and ophthalmic administration which comprises in an aqueous solution having a pH of about 6 to about 8, a 21-phosphate ester of a physiologically active 21-hydroxy steroid, a salt of saccharin more water soluble than saccharin itself and an antioxidant.

3. A pharmaceutical formulation suitable for parenteral and ophthalmic administration which comprises in an aqueous solution having a pH of about 6 to about 8, the 21-phosphate ester of triamcinolone 16,17-acetonide, an alkali metal salt of saccharin and an antioxidant, said ester being present in a concentration of about 0.025 mg. to about 100 mg. per ml.

4. A pharmaceutical formulation suitable for parenteral and opthalmic administration which comprises an aqueous solution of the 21-phosphate ester of triamcinolone 16,17-acetonide, sodium saccharin and sodium bisulfite in an aqueous solution at a pH of about 6 to about 8, said phosphate ester being in a concentration of about 0.025 mg. to about 100 mg. per ml., the sodium saccharin being in a concentration of about 1 mg. to about 20 mg. per ml., and the sodium bisulfite being in a concentration of about 0.5 mg. to about 10 mg. per ml.

5. A pharmaceutical formulation suitable for parenteral and ophthalmic administration which comprises in an aqueous solution having a pH of about 6 to about 8, a 21 phosphate ester of a physiologically active 21-hydroxy steroid and a salt of saccharin more water soluble than saccharin itself, said ester being present in a concentration of about 0.025 mg. to about 100 mg. per ml.

References Cited in the file of this patent
UNITED STATES PATENTS

| | | |
|---|---|---|
| 2,686,145 | Klotz et al. | Aug. 10, 1954 |
| 2,779,775 | Sarett | Jan. 29, 1957 |
| 2,870,177 | Conbere et al. | Jan. 20, 1959 |
| 2,950,298 | Elks et al. | Aug. 23, 1960 |
| 2,970,944 | Charnicki et al. | Feb. 7, 1961 |
| 2,990,401 | Bernstein et al. | June 27, 1961 |
| 3,053,834 | Fried | Sept. 11, 1962 |
| 3,073,743 | Spero | Jan. 15, 1963 |

OTHER REFERENCES

Chemical Abstracts (1) 54:18895$^t$ (1960); (2) 46:2242h (1952).

U.S. Dispensatory, 25th edition, volume 2, 1960, pages 223–224.